United States Patent
Kwon et al.

(10) Patent No.: US 8,059,913 B2
(45) Date of Patent: Nov. 15, 2011

(54) IMAGE CORRECTION METHOD AND APPARATUS

(75) Inventors: Jae-hyun Kwon, Yongin-si (KR); Hyun-wook Ok, Seoul (KR); Seong-deok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 965 days.

(21) Appl. No.: 11/826,461

(22) Filed: Jul. 16, 2007

(65) Prior Publication Data

US 2008/0056567 A1    Mar. 6, 2008

(30) Foreign Application Priority Data

Sep. 5, 2006    (KR) .................. 10-2006-0085288

(51) Int. Cl.
*G06K 9/00* (2006.01)
*G06K 9/40* (2006.01)
*G09G 5/00* (2006.01)
*G03F 3/08* (2006.01)

(52) U.S. Cl. ......... 382/274; 382/167; 345/617; 358/522

(58) Field of Classification Search .......... 382/167–169, 382/274, 170, 172; 345/589, 590, 617; 358/518–523
See application file for complete search history.

(56) References Cited

U.S. PATENT DOCUMENTS

| | | | | |
|---|---|---|---|---|
| 7,574,042 | B2 * | 8/2009 | Tsuruoka et al. | 382/169 |
| 2003/0174886 | A1 * | 9/2003 | Iguchi et al. | 382/167 |
| 2004/0131273 | A1 * | 7/2004 | Johnson et al. | 382/254 |
| 2005/0013503 | A1 * | 1/2005 | Park et al. | 382/254 |
| 2005/0031201 | A1 * | 2/2005 | Goh | 382/169 |
| 2005/0207642 | A1 * | 9/2005 | Yano | 382/162 |
| 2006/0153446 | A1 * | 7/2006 | Oh et al. | 382/169 |

FOREIGN PATENT DOCUMENTS

| | | |
|---|---|---|
| CN | 1067347 A | 12/1992 |
| CN | 1162799 A | 10/1997 |
| JP | 11-283011 | 10/1999 |
| JP | 2001-34748 | 2/2001 |
| KR | 10-0437807 | 6/2004 |
| KR | 10-2004-0073722 | 8/2004 |
| KR | 10-2004-0080456 | 9/2004 |

OTHER PUBLICATIONS

Stark ("Adaptive Image Contrast Enhancement Using Generalizations of Histogram Equalization," IEEE Transactions on Image Processing, vol. 9, No. 5, May 2000, pp. 889-896).*
Chinese Office Action mailed on Jul. 30, 2010 in corresponding Chinese Patent Application No. 200710149126.5.
English translation of Korean Patent Office Action, mailed Sep. 19, 2007 and issued in corresponding Korean Patent Application No. 10-2006-0085288.

* cited by examiner

*Primary Examiner* — Yubin Hung
(74) *Attorney, Agent, or Firm* — Staas & Halsey LLP

(57) ABSTRACT

Provided is an image correction method and apparatus which can enhance the performance of image correction without deteriorating image quality. The image correction method includes creating a cumulative density function (CDF) based on a luminance histogram of an input image; calculating a plurality of correction parameters, which will be respectively applied to a plurality of different luminance adjustment functions, based on the CDF of the input image; and correcting luminance of the input image using the correction parameters and the luminance adjustment functions.

25 Claims, 12 Drawing Sheets

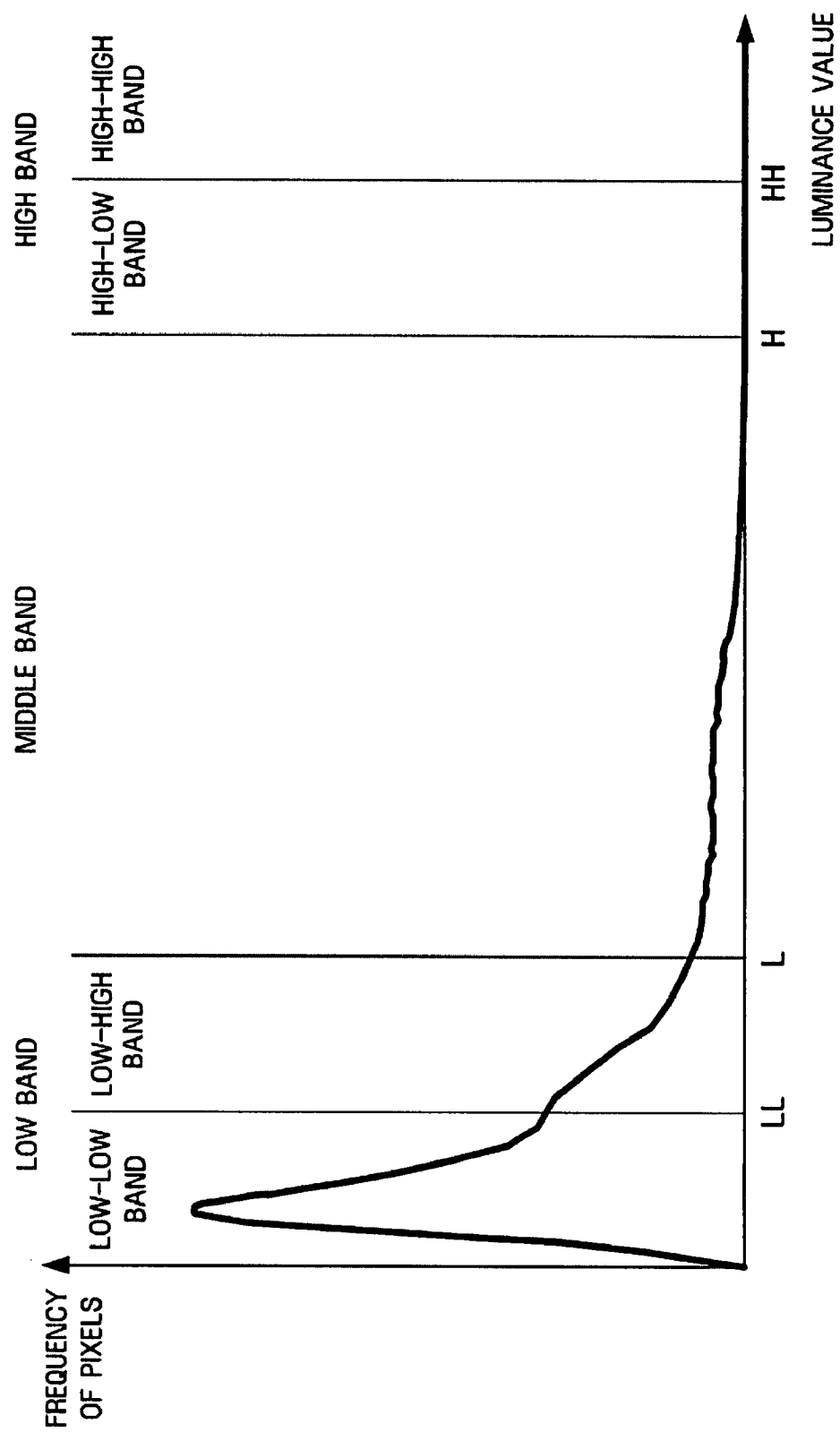

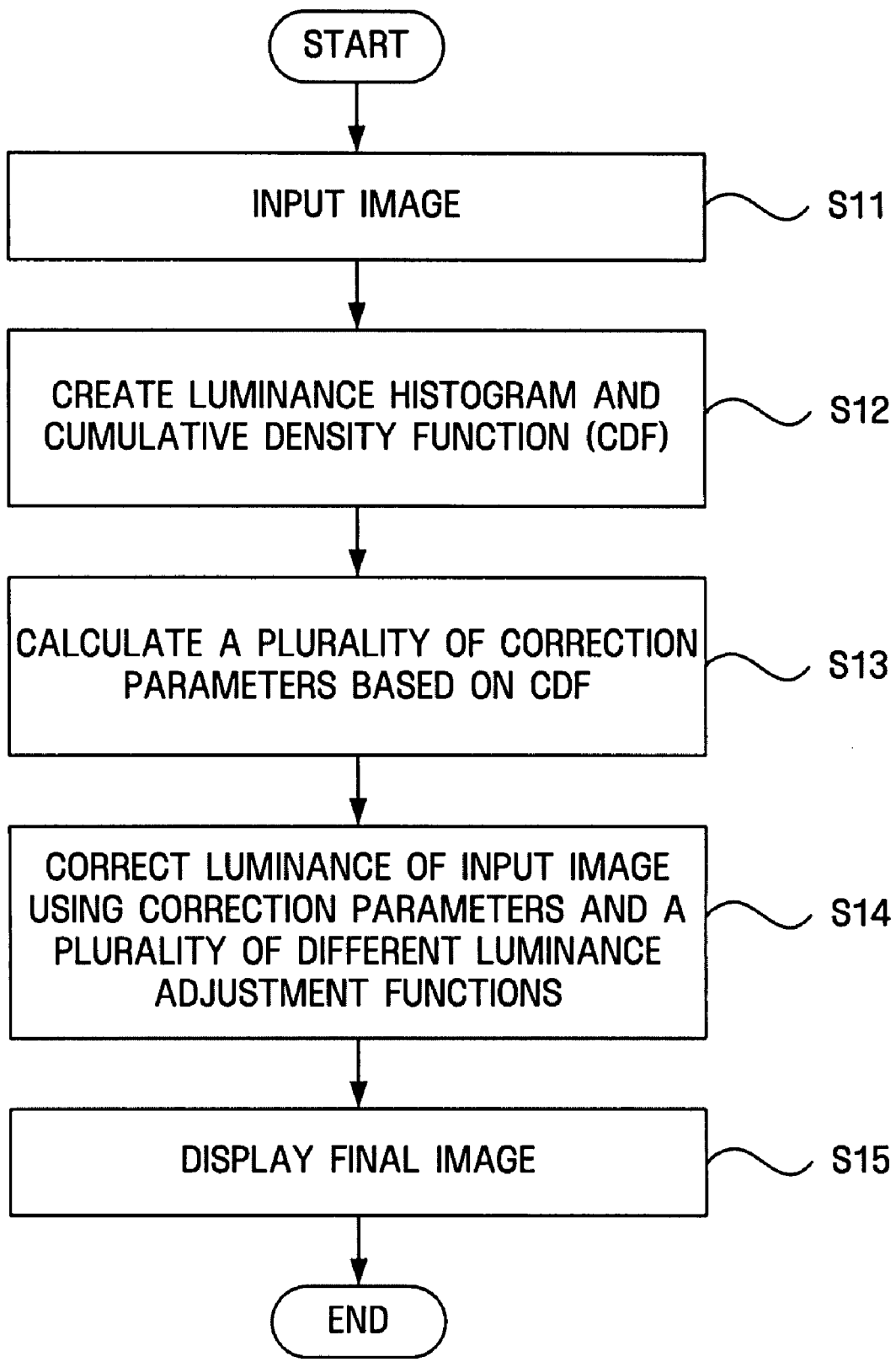

IMAGE CORRECTION METHOD AND APPARATUS

CROSS-REFERENCE TO RELATED APPLICATIONS

This application claims priority from Korean Patent Application No. 10-2006-0085288 filed on Sep. 5, 2006 in the Korean Intellectual Property Office, the disclosure of which is incorporated herein by reference in its entirety.

BACKGROUND OF THE INVENTION

1. Field of the Invention

The present invention relates to an image correction method and apparatus, and more particularly, to an image correction method and apparatus which can enhance the performance of image correction without deteriorating the image quality.

2. Description of the Related Art

Information provided to users by image acquisition apparatuses, such as digital cameras, includes not only text information but also various content such as still images, moving images and sounds. Of various forms of multimedia information, moving images, in particular, are a basis for video-on-demand (VOD) or interactive services. Therefore, relevant standardization proposals are being actively studied.

With the development of digital electronic engineering technology, conventional analog data is being converted into digital data. Accordingly, techniques to process various digital image data have been introduced to efficiently handle a huge amount of data. These digital image processing techniques have the following advantages.

First, when an analog image processing apparatus processes an analog signal, noise is inevitably added to the analog signal. Therefore, the deterioration of image quality cannot be avoided in the case of analog signals processed by the analog image processing apparatus. However, such deterioration of image quality does not occur when a digital image processing apparatus is used.

Second, since a signal is converted into a digital signal and processed accordingly, signal processing using a computer is possible. In other words, since an image signal is processed using a computer, various image processing operations, such as compressing image information, can be performed.

Currently, most of conventional digital image signal display apparatuses, such as liquid crystal displays (LCDs), plasma display panels (PDPs) and organic light emitting diodes (OLEDs), are adopting a red (R), green (G) and blue (B) color model.

A color model (or color space) is a method of representing the relationship between a color and other colors. Different image processing systems use different color models for different reasons. The RGB color model is composed of R, G and B, which are additive primary colors. Spectral elements of these primary colors are additionally combined to produce colors.

The RGB model is represented by a three-dimensional (3D) cube with R, G and B at edges of each axis. Black is located at the origin of the 3D cubic, and white is located at an opposite end of the 3D cubic. For example, in a 24-bit color graphic system having 8 bits per color channel, R is represented by (255,0,0).

The RGB model simplifies the design of computer graphic systems but is not ideal for all applications since there is a high correlation between R, G and B color components. Many image processing techniques, such as histogram equalization, process images using only the brightness thereof. Therefore, it is required to frequently convert an RGB image into a brightness image. In order to convert an RGB image to a grayscale image, a sum of the R, G and B color components respectively multiplied by ⅓, that is, a mean value of the R, G and B color components, may be used. However, the following equation may also be used according to a National Television Systems Committee (NTSC) standard.

$$Y = 0.288R + 0.587G + 0.114B \quad (1).$$

Technologies to improve image quality have been continuously studied as one of technological fields related to image representation techniques that are based on RGB sub-pixels. Conventional methods of improving image quality include adjusting the overall brightness of an image and performing histogram equalization.

If the overall brightness of an image is adjusted, the brightness of a dark area may be improved. However, since saturation occurs in a bright area, information is lost. In addition, although histogram equalization can be performed in a short period of time, the quality of an output image deteriorates after histogram equalization. A Retinex algorithm may also be used as another way to improve image quality. However, since a large-sized filter is needed to obtain an image of desired quality in the Retinex algorithm, the amount of calculation required increases.

In this regard, various inventions (for example, Korean Patent Publication No. 2004-080456, entitled "Method of Correcting Image Quality of Mobile Telecommunication Terminal with Built-in Camera") have been suggested but still fail to solve the above problems.

SUMMARY OF THE INVENTION

Additional aspects and/or advantages of the invention will be set forth in part in the description which follows and, in part, will be apparent from the description, or may be learned by practice of the invention.

The present invention provides an image correction method and apparatus which can enhance the performance of image correction without deteriorating image quality.

However, the aspects of the present invention are not restricted to the one set forth herein. The above and/or other aspects of the present invention will become more apparent to one of daily skill in the art to which the present invention pertains by referencing a detailed description of the present invention given below.

According to an aspect of the present invention, there is provided an image correction method including creating a cumulative density function (CDF) based on a luminance histogram of an input image; calculating a plurality of correction parameters, which will be respectively applied to a plurality of different luminance adjustment functions, based on the CDF of the input image; and correcting luminance of the input image using the correction parameters and the luminance adjustment functions.

According to another aspect of the present invention, there is provided an image correction apparatus including an image analysis unit to create a CDF based on a luminance histogram of an input image; a correction parameter calculation unit to calculate a plurality of correction parameters, which will be respectively applied to a plurality of different luminance adjustment functions, based on the CDF of the input image; and an image processing unit to correct luminance of the input image using the correction parameters and the luminance adjustment functions.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 2 illustrates a luminance histogram of an image according to an embodiment of the present invention;

FIG. 3A-FIG. 3F-2 illustrate six representative models into which an input image is classified according to an embodiment of the present invention;

FIG. 13 is a flowchart illustrating an image correction method according to an embodiment of the present invention.

DETAILED DESCRIPTION OF THE PREFERRED EMBODIMENTS

Figure 1:
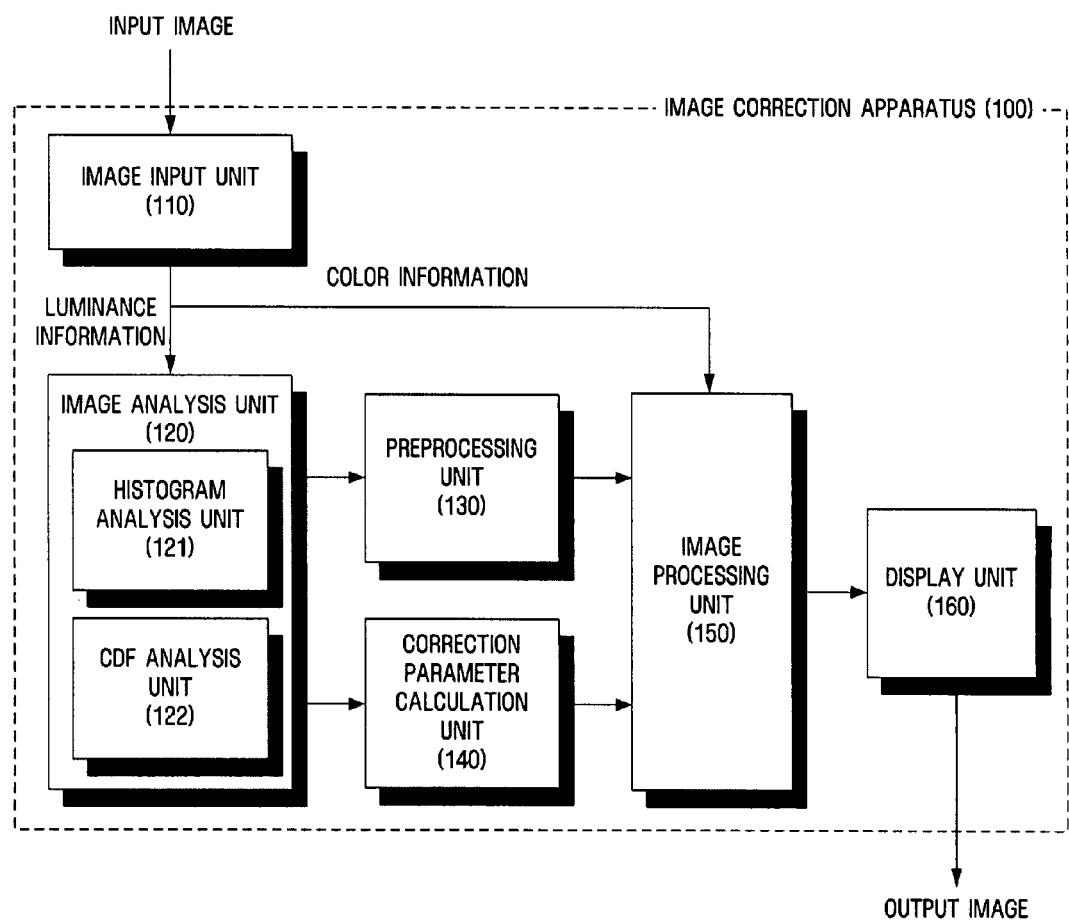
FIG. 1 is a block diagram of an image correction apparatus according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

Hereinafter, an image correction method and apparatus according to embodiments of the present invention will be described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a block diagram of an image correction apparatus 100 according to an embodiment of the present invention. Referring to FIG. 1, the image correction apparatus 100 includes an image input unit 110, an image analysis unit 120, a preprocessing unit 130, a correction parameter calculation unit 140, an image processing unit 150, and a display unit 160.

The image input unit 110 receives an image (a still image or a moving image) from a predetermined image source. Here, the input image may be a signal in a red (R), green (G) and blue (B) format or in other signal formats, such as an YCbCr format.

If the input image is a signal in the RGB format, the image input unit 110 converts the input image from the RGB format into a format, e.g., a hue (H), saturation (S) and value (V) format, in which the input image is divided into a luminance signal and a color signal. In other words, the image input unit 110 converts an RGB color space into an HSV color space defined by H, S and V. For color space conversion, Equation (2) below may be used.

$$H = \begin{cases} \left(0 + \frac{G-B}{MAX-MIN}\right) \times 60, & \text{if } R = MAX \\ \left(2 + \frac{B-R}{MAX-MIN}\right) \times 60, & \text{if } G = MAX \\ \left(4 + \frac{R-G}{MAX-MIN}\right) \times 60, & \text{if } B = MAX \end{cases} \quad (2)$$

$$S = \frac{MAX - NIM}{MAX}$$

$$V = MAX.$$

Equation (2) indicates an (H, S, V) value equal to an (R, G, B) value when each of R, G and B has a value between 0.0 (minimum) and 1.0 (maximum). In Equation (2), MAX indicates a maximum (R, G, B) value, and MIN indicates a minimum (R, G, B) value.

The image analysis unit 120 creates a probability density function (PDF) using luminance information of the input image and creates a cumulative density function (CDF) of the input image through integral operation on the PDF (hereinafter, referred to as a luminance histogram). To this end, the image analysis unit 120 may include a histogram analysis unit 121 and a CDF analysis unit 122.

The histogram analysis unit 121 creates a luminance histogram of the input image using the luminance information of the input image and calculates parameters that can represent the luminance histogram.

Figure 3A:
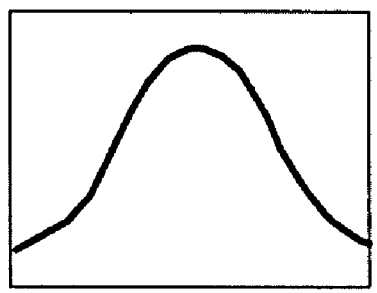
Figure 3B:
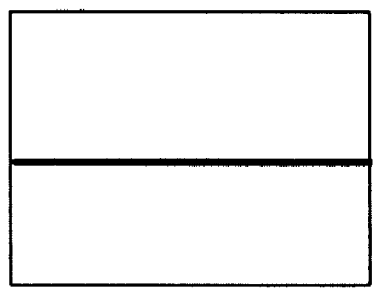
Figure 3C:
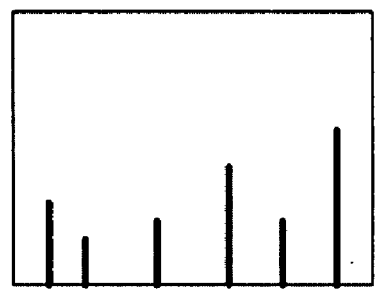
Figure 3D:
Figures 1, 3D:
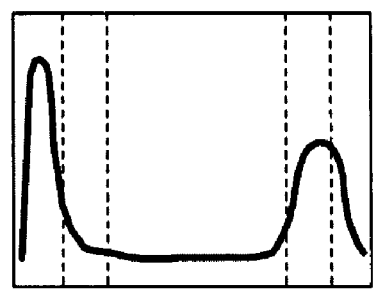
Figures 2, 3D:
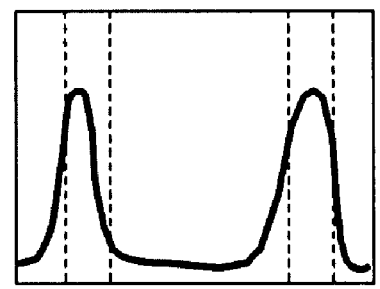

FIG. 2 illustrates a luminance histogram of an image according to an embodiment of the present invention. Referring to FIG. 2, a horizontal axis of the luminance histogram indicates luminance values of pixels that form an input image. In the case of an 8-bit mage, the luminance values are in the range of 0 to 255. A vertical axis of the luminance histogram indicates frequency of pixels for each luminance value. The horizontal axis is divided into a low band, a middle band, and a high band. A boundary L between the low band and the middle band may indicate a luminance value corresponding to the bottom 25% of the luminance histogram, and a boundary H between the middle band and the high band may indicate a luminance value corresponding to the top 25% of the luminance histogram. Furthermore, the low band may be sub-divided into a low-low band and a low-high band, and the high band may be sub-divided into a high-low band and a high-high band. In this case, a boundary LL between the low-low band and the low-high band may indicate a luminance value corresponding to the bottom 15% of the luminance histogram, and a boundary HH between the high-low band and the high-high band may indicate a luminance value corresponding to the top 15% of the luminance histogram.

The parameters that represent the luminance histogram may include, for example, the number of pixels included in the high band, the number of pixels included in the middle band, the number of pixels included in the low band, the number of pixels included in the low-low band, the number of pixels included in the low-high band, the number of pixels included in the high-low band, and the number of pixels included in the high-high band.

Referring to FIG. 1, the histogram analysis unit 121 calculates the parameters based on the luminance histogram, analyzes the calculated parameters, and determines which of a predetermined number of representative models the input image corresponds to. Hereinafter, representative models will be described with reference to FIG. 3.

Figure 3E:
Figures 1, 3E:
Figures 2, 3E:
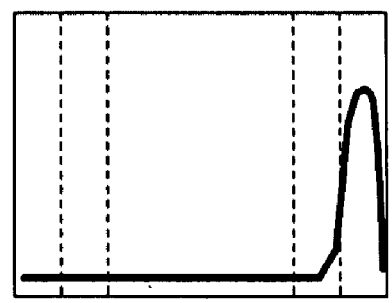
Figure 3F:
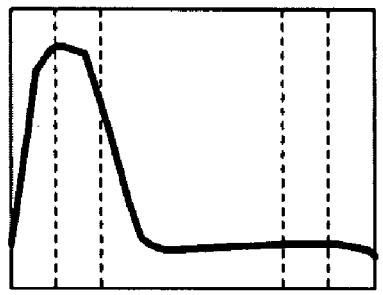
Figures 1, 3F:
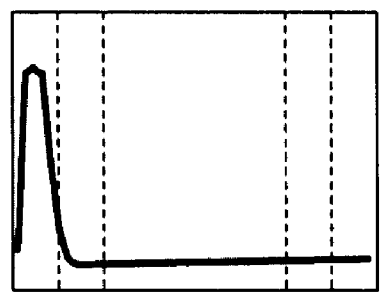
Figures 2, 3F:

FIG. 3A-FIG. 3F-2 illustrate six representative models into which an input image is classified according to an embodiment of the present invention. FIG. 3A represents an image having a large number of pixels in the middle band and a smaller number of pixels in the high band and the low band. FIG. 3B represents an image having even distribution of luminance values. FIG. 3C represents an image having a large number of discontinuous luminance values. FIG. 3D represents an image having a large number of pixels in the low band and the high band, i.e., an image with high contrast. FIG. 3E represents an image having a large number of pixels in the high band and a smaller number of pixels in the low band and the middle band, that is, a bright image. FIG. 3F represents an image having a large number of pixels in the low band and a smaller number of pixels in the middle band and the high band, that is, a dark image.

The six models into which the input image was classified based on a luminance histogram thereof have been described above. However, the number of models into which the input image is classified and the forms of the models may be sub-divided or simplified. For example, FIG. 3D may be sub-divided in to a FIG. 3D-1 and FIG. 3D-2. FIG. 3D-1 represents an image having a large number of pixels in the low-low band and the high band, that is, an image having a dark-shadow area and a highlight area. FIG. 3D-2 represents an image having a large number of pixels in the low-high band and the high band, that is, an image having a shadow area and a highlight area.

In addition, FIG. 3E may be sub-divided into FIG. 3E-1 and FIG. 3E-2. FIG. 3E-1 represents an image having a large number of pixels in the high-low band, that is, a highlight image. FIG. 3E-2 represents an image having a large number of pixels in the high-high band, that is, an image with saturated luminance.

FIG. 3F may also be sub-divided into FIG. 3F-1 and FIG. 3F-2. FIG. 3F-1 represents an image having a large number of pixels in the low-low band, that is, a dark-shadow image, and FIG. 3F-2 represents an image having a large number of pixels in the low-high band, that is, a shadow image.

Referring to FIG. 1, the histogram analysis unit 121 compares the parameters with respective predetermined threshold values and classifies the input image. Specifically, after analyzing the luminance histogram of the input image, if the number of pixels included in the high band accounts for greater than a threshold rate (e.g., 25%) of the total number of pixels and if the number of pixels included in the low band accounts for less than the threshold rate, the histogram analysis unit 121 may classify the input image as FIG. 3E. If the number of pixels included in the high-low band is greater than the number of pixels included in the high-high band, the input image may be classified as FIG. 3E-1. Conversely, if the number of pixels included in the high-high band is greater than the number of pixels included in the high-low band, the input image may be classified as FIG. 3E-2.

After analyzing the luminance histogram of the input image, if the number of pixels included in the high band accounts for less than the threshold rate and if the number of pixels included in the low band accounts for greater than the threshold rate, the histogram analysis unit 121 may classify the input image as FIG. 3F. If the number of pixels included in the low-low band is greater than the number of pixels included in the low-high band, the input image may be classified as FIG. 3F-1. Conversely, if the number of pixels included in the low-high band is greater than the number of pixels included in the low-low band, the input image may be classified as FIG. 3F-2.

If the number of pixels included in the high band and the number of pixels included in the low band account for greater than the threshold rate, the input image may be classified as FIG. 3D.

Referring to FIG. 1, the CDF analysis unit 122 creates a CDF of the input image through the integral operation on the luminance histogram of the input image.

Figure 4:
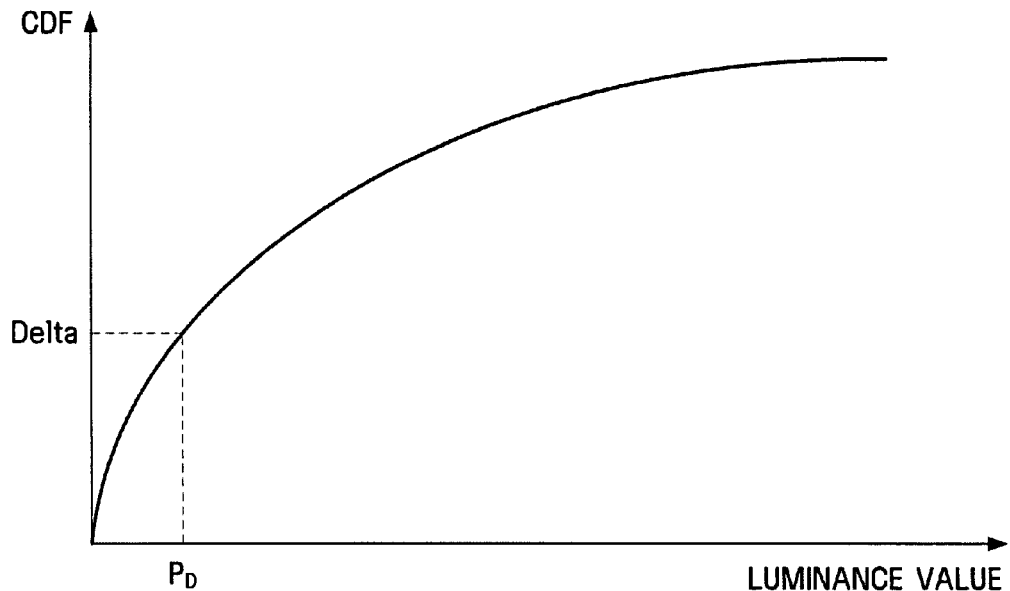
FIG. 4 illustrates a cumulative density function (CDF) of an image according to an embodiment of the present invention.

FIG. 4 illustrates a CDF created based on a luminance histogram of an input image according to an embodiment of the present invention. Referring to FIG. 4, a horizontal axis of the CDF indicates a luminance value of the input image, and a vertical axis indicates a cumulative value of frequency of pixels for each luminance value. In FIG. 4, as the luminance value increases, the degree by which a CDF value is increased, that is, an increase rate of the CDF value, is reduced. This is because most of pixels that form the input image have low luminance values.

Referring to FIG. 1, the preprocessing unit 130 increases the luminance of the input image using a preprocessing function selected from a plurality of preprocessing functions to adjust the luminance of the input image. The preprocessing unit 130 may increase the luminance of the input image more when the input image includes a greater number of pixels having low luminance values. In order to vary the degree by which luminance is increased according to the type of the input image, it may be desirable to select a preprocessing function using, as a parameter, a CDF value (delta) which corresponds to a predetermined luminance value in the CDF of the input image.

Specifically, the preprocessing unit 130 selects a CDF value (delta) corresponding to a predetermined luminance value PD among a plurality of luminance values included in the low band of the CDF as a parameter to preprocess function selection. Once the parameter to preprocess function selection is selected, the preprocessing unit 130 selects a preprocessing function corresponding to the selected parameter from a plurality of preprocessing functions. For example, if the parameter selected based on the CDF is 100, the preprocessing unit 130 selects a preprocessing function corresponding to the selected parameter of 100. Then, the preprocessing unit 130 increases the luminance of each pixel that forms the input image based on the selected preprocessing function.

Figure 5:
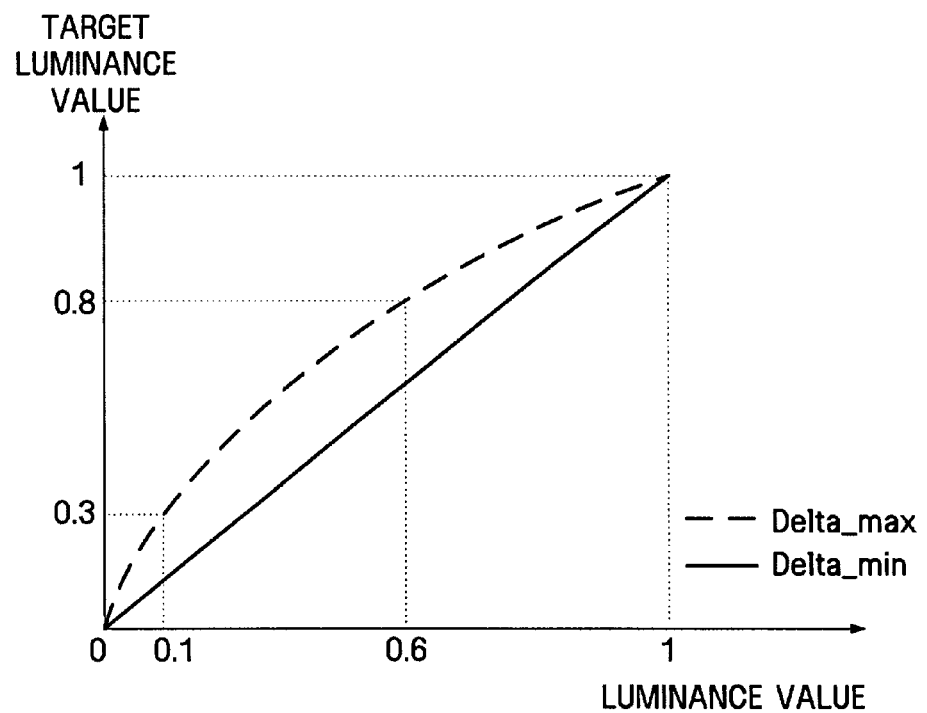
FIG. 5 illustrates a preprocessing function according to an embodiment of the present invention.

A more detailed description will be made with reference to FIG. 5. FIG. 5 illustrates a preprocessing function corresponding to a parameter (delta) which is selected based on a CDF according to an embodiment of the present invention. Referring to FIG. 5, a horizontal axis of the preprocessing function indicates an input luminance value, and a vertical axis indicates an output luminance value corresponding to the input luminance value. In FIG. 5, the range of luminance values is standardized to a range of 0 to 1 and represented accordingly. It can be seen from FIG. 5 that preprocessing functions generally take the form of a log function on the whole while specific forms of the preprocessing functions are rather different. The preprocessing function indicates target luminance to which the luminance of each pixel that forms an input image should be increased. For example, if the parameter (delta) selected based on the CDF is Delta_max, the preprocessing function corresponding to the selected parameter increases a luminance value, which is currently 0.1, of a pixel to 0.3. In the case of a pixel having a luminance value of 0.6, the preprocessing function increases the luminance value of the pixel from 0.6 to 0.8. After the luminance of the input image is improved by this preprocessing function, the input image with improved luminance is provided to the image processing unit 150, which will be described later.

Referring to FIG. 1, when the luminance of each pixel that forms the input image is corrected using a luminance adjustment function, the correction parameter calculation unit 140 calculates a correction parameter that is to be applied to the luminance adjustment function. A correction parameter denotes a weight to be applied to a luminance adjustment function. In other words, when the luminance of an input image is adjusted using the luminance adjustment function, the correction parameter determines the degree to which the luminance of the input image is to be adjusted. The correction parameter includes a correction parameter (hereinafter referred to as a first correction parameter) used to correct the luminance of a low-luminance area in the input image and a correction parameter (hereinafter referred to as a second correction parameter) used to correct the luminance of a high-luminance area in the input image. The first correction parameter may be calculated using the CDF of the input image, and the second correction parameter may be calculated using the first correction parameter. The 'low-luminance area' denotes an area that includes pixels having luminance values less than a predetermined threshold value, and the 'high-luminance area' denotes an area that includes pixels having luminance values greater than the threshold value. The threshold value may be determined by the luminance adjustment function.

Before describing a method of calculating the first correction parameter using the CDF of the input image, a luminance adjustment function according to an embodiment of the present invention will now be described.

Figure 6:
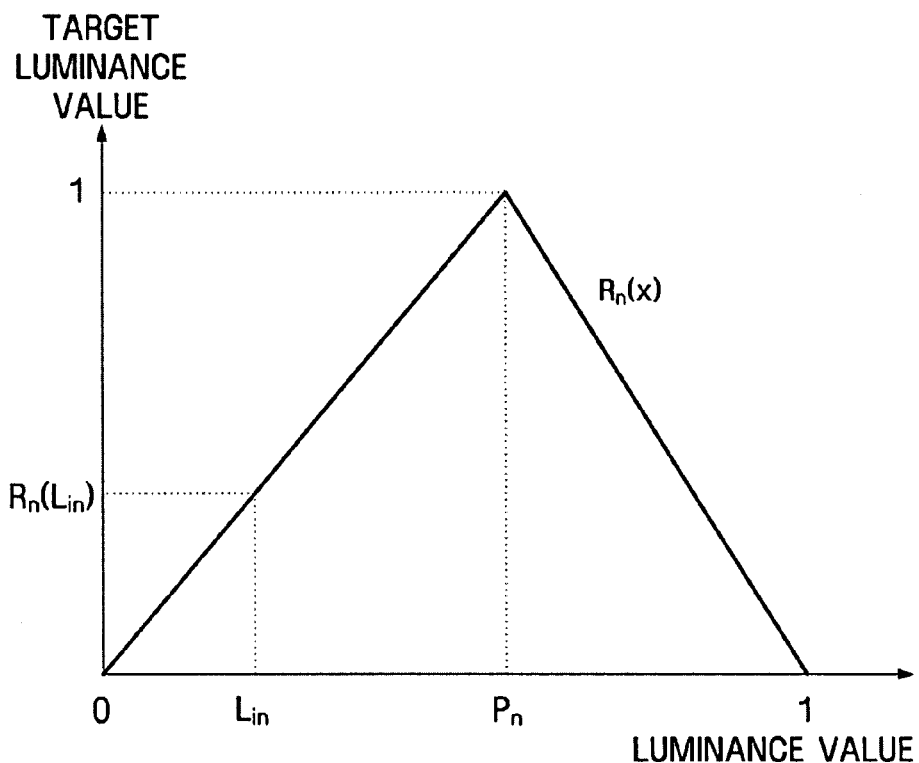
FIG. 6 illustrates a luminance adjustment function according to an embodiment of the present invention.

FIG. 6 illustrates a luminance adjustment function $R_n(x)$ according to an embodiment of the present invention. Referring to FIG. 6, a horizontal axis of the luminance adjustment function $R_n(x)$ indicates luminance values of pixels that form an input image, and a vertical axis indicates target luminance values to which the luminance values on the horizontal axis are to be changed. On the horizontal and vertical axes, the range of luminance values may be standardized to a range of 0 to 1 and represented accordingly. The luminance adjustment function $R_n(x)$ indicates the degree to which the luminance of each pixel that forms the input image should be increased. The luminance adjustment function $R_n(x)$ increases from a minimum luminance value to a predetermined luminance value $P_n$ and then decreases from the predetermined luminance value $P_n$ to a maximum luminance value. Specifically, the luminance adjustment function $R_n(x)$ may linearly increase from the minimum luminance value to the predetermined luminance value $P_n$ and then linearly decrease from the predetermined luminance value $P_n$ to the maximum luminance value. In another embodiment of the present invention, a non-linear function which monotonously increases from the minimum luminance value to the predetermined luminance value $P_n$ and then monotonously decreases from the predetermined luminance value $P_n$ to the maximum luminance value may also be used. Hereinafter, the luminance adjustment function $R_n(x)$, which linearly increases from the minimum luminance value to the predetermined luminance value $P_n$ and then linearly decreases from the predetermined luminance value $P_n$ to the maximum luminance value, will be described as an example. Equation (3) is a mathematical representation of a luminance value output by a luminance adjustment function. In Equation (3), $L_{in}$ indicates a luminance value of an input image.

$$R_n(L_{in}) = \begin{cases} \dfrac{1}{P_n} \times L_{in}, & \text{if } P_n \langle L_{in} \\ \dfrac{-1}{1-P_n} \times L_{in} + \dfrac{1}{1-P_n}, & \text{if } P_n \geq L_{in}. \end{cases} \quad (3)$$

Figure 7:
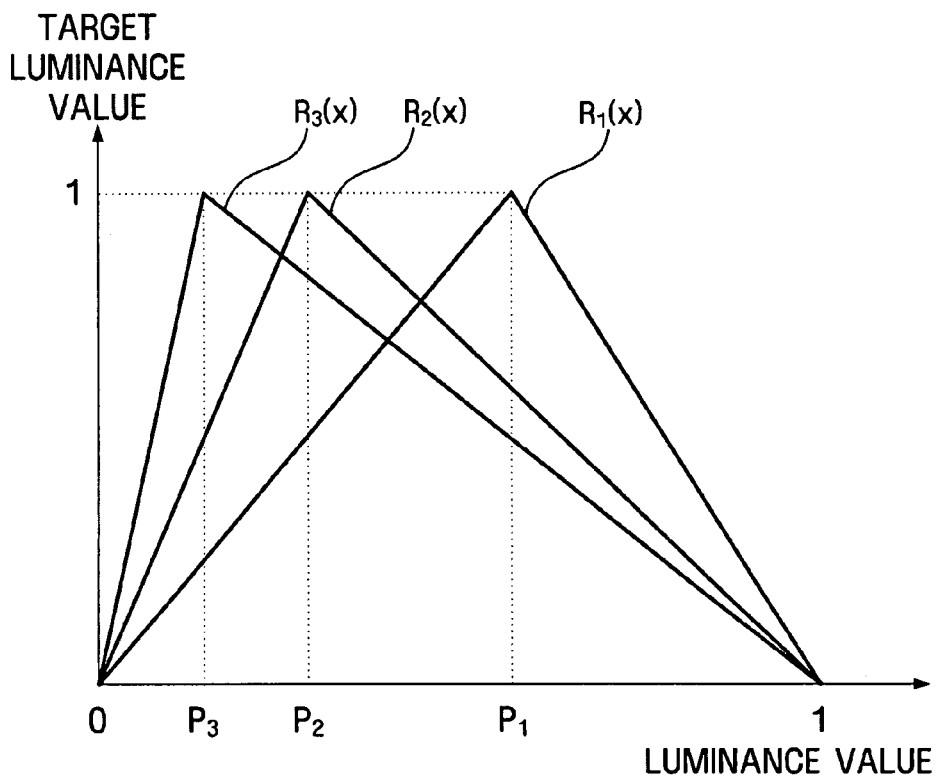
FIG. 7 illustrates three different luminance adjustment functions according to an embodiment of the present invention.

According to an embodiment of the present invention, a plurality of luminance adjustment functions having the predetermined luminance value $P_n$ at different positions may be used. FIG. 7 illustrates first through third luminance adjustment functions $R_1(x)$ through $R_3(x)$ having predetermined luminance values $P_1$ through $P_3$ at different positions, respectively, according to an embodiment of the present invention. Hereinafter, a case where the first through third luminance adjustment functions $R_1(x)$ through $R_3(x)$ illustrated in FIG. 7 are used will be described as an embodiment.

If a plurality of luminance adjustment functions are used as illustrated in FIG. 7, the first correction parameter that is to be applied to each luminance adjustment function may be determined proportionally to the predetermined luminance value $P_n$. Specifically, it is assumed that the first correction parameters of the first through third luminance adjustment functions $R_1(x)$ through $R_3(x)$ are $W_1$, $W_2$ and $W_3$, respectively. In this case, since $P_1 > P_2 > P_3$, the first correction parameters of the first through third luminance adjustment functions $R_1(x)$ through $R_3(x)$ may be $W_1 > W_2 > W_3$. To satisfy this condition, the first correction parameters $W_1$, $W_2$ and $W_3$ may be calculated using a CDF of an input image.

Figure 8:
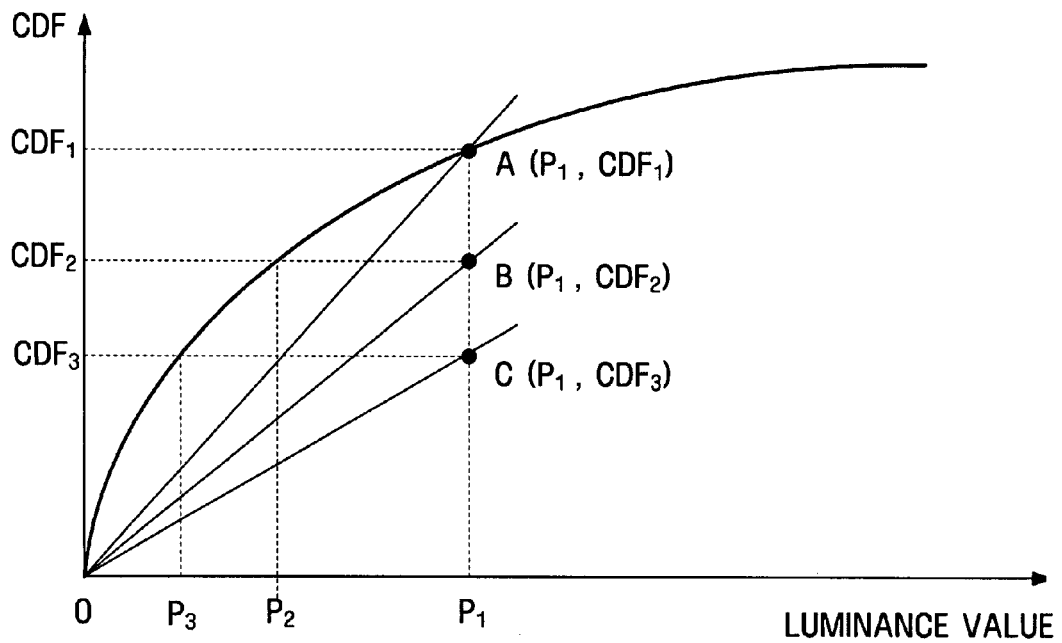
FIG. 8 is a diagram to explain a method of calculating a first correction parameter corresponding to each luminance adjustment function based on a CDF of an input image that includes a large number of pixels having low luminance values.

Specifically, referring to FIG. 8, the first correction parameter $W_1$ of the first luminance adjustment function $R_1(x)$ may be determined by a slope $CDF_1/P_1$ of a straight line passing through the origin and a point A ($P_1$, $CDF_1$), which has the predetermined luminance value $P_1$ and a CDF value corresponding to the predetermined luminance value $P_1$ as coordinate values. In addition, the first correction parameter $W_2$ of the second luminance adjustment function $R_2(x)$ may be determined by a slope $CDF_2/P_1$ of a straight line passing through the origin and a point B ($P_1$, $CDF_2$), which has the predetermined luminance value $P_1$ and a CDF value corresponding to the predetermined luminance value $P_2$ as coordinate values. The first correction parameter $W_3$ of the third luminance adjustment function $R_3(x)$ may be determined by a slope $CDF_3/P_1$ of a straight line passing through the origin and a point C ($P_1$, $CDF_3$), which has the predetermined luminance value $P_1$ and a CDF value corresponding to the predetermined luminance value $P_3$ as coordinate values. If the first correction parameter that is to be applied to each luminance adjustment function is set proportionally to the predetermined luminance value $P_n$ in this way, partial gray scale inversion, which may occur in a low-luminance correction image obtained after a low-luminance area of an input image is corrected using each luminance adjustment function, can be prevented.

Figure 9:
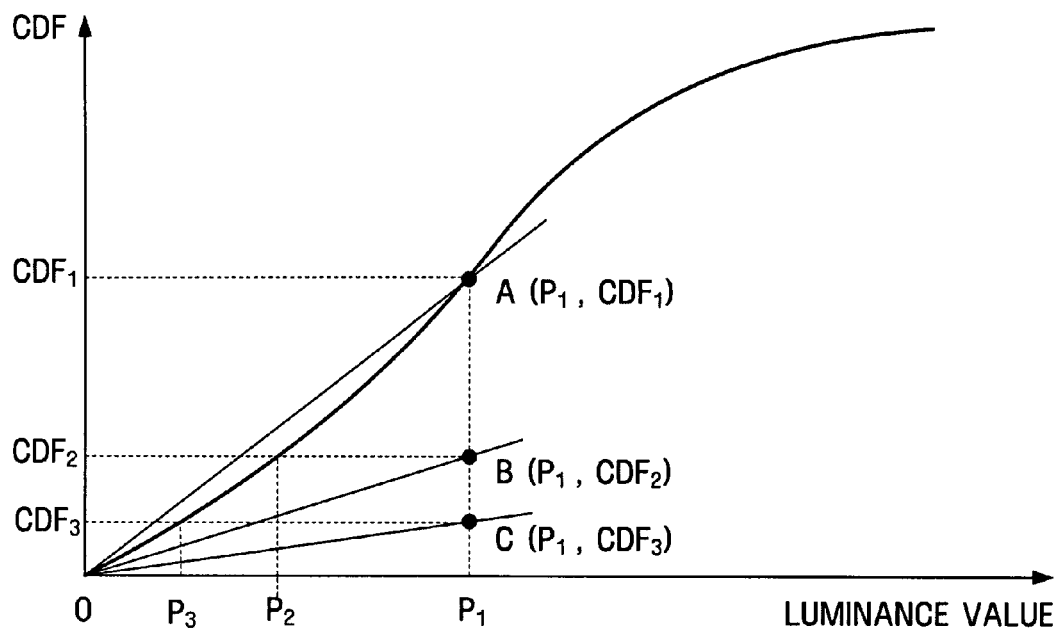
FIG. 9 is a diagram for explaining a method of calculating the first correction parameter corresponding to each luminance adjustment function based on a CDF of an input image that includes a smaller number of pixels having low luminance values.

In addition, if the first correction parameter of each luminance adjustment function is calculated using the CDF of the input image, the first correction parameters may be adaptively set for the input image. A method of calculating the first correction parameters will be described in more detail with reference to FIGS. 8 and 9. In a CDF illustrated in FIG. 8, as a luminance value increases, the degree by which a CDF value is increased, that is, an increase rate of the CDF value, is reduced. In other words, the CDF illustrated in FIG. 8 is a CDF of an input image that includes a large number of pixels having low luminance values. On the other hand, in a CDF illustrated in FIG. 9, as the luminance value increases, the degree by which the CDF value is increased, that is, the increase rate of the CDF value, is also increased. If slopes of straight lines illustrated in FIG. 8 are compared with those of straight lines illustrated in FIG. 9, it can be understood that they are different from one another.

Once the first correction parameter of each luminance adjustment function is set as described above, the second correction parameter of each luminance adjustment function can be calculated using each of the first correction parameters. For example, it is assumed that the second correction parameters of the first through third luminance adjustment functions $R_1(x)$ through $R_3(x)$ are $W_4$, $W_5$ and $W_6$, respectively. In this case, the second correction parameters $W_4$, $W_5$ and $W_6$ may be calculated using Equation (4).

$$W_4=1-W_1$$
$$W_5=1-W_2$$
$$W_6=1-W_3 \qquad (4).$$

In another embodiment, the second correction parameters $W_4$, $W_5$ and $W_6$ may be given by Equation (5).

$$W_4=W_1$$
$$W_5=W_2$$
$$W_6=W_3 \qquad (5).$$

Luminance adjustment functions and a method of calculating correction parameters respectively corresponding to the luminance adjustment functions have been described above. In the above example, the number of luminance adjustment functions was three. However, the present invention is not limited thereto. Therefore, a greater number of luminance adjustment functions may be used. In addition, the method of calculating the first correction parameters while the position of the predetermined luminance value $P_n$ is fixed was used in the above example. However, the position of the predetermined luminance value $P_n$ may change according to the type of an input image. For example, if an input image includes a large number of pixels having low luminance values, the predetermined luminance value $P_n$ may be located toward the low band. Conversely, if the input image includes a large number of pixels having high luminance values, the predetermined luminance value $P_n$ may be located toward the high band.

Figure 10:
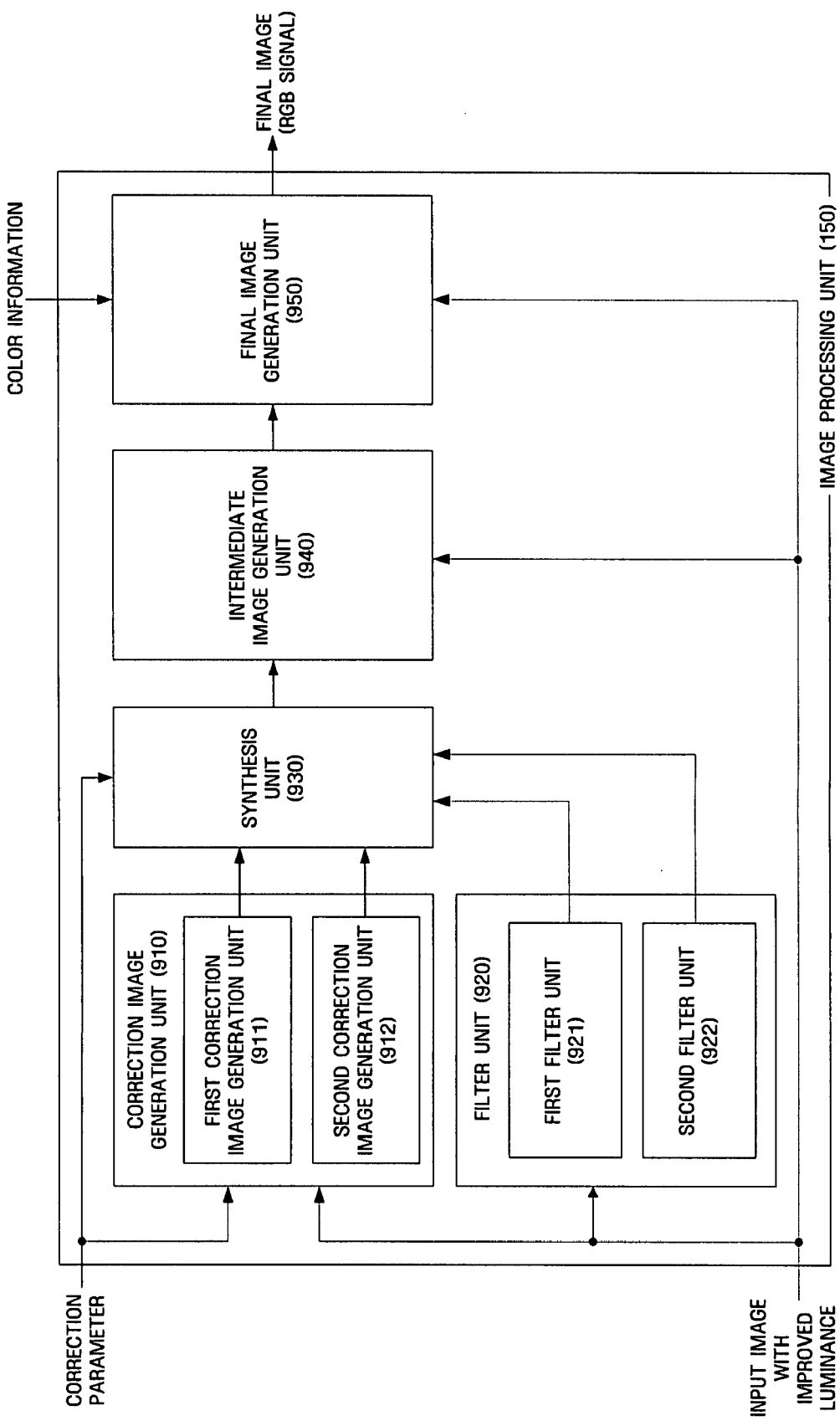
FIG. 10 is a detailed block diagram of an image correction unit of FIG. 1.

Referring to FIG. 10, the image processing unit 150 corrects luminance of the input image using a plurality of luminance adjustment functions and correction parameters respectively corresponding to the luminance adjustment functions. The image correction unit 150 will now be descried in more detail with reference to FIG. 10.

FIG. 10 is a detailed block diagram of the image correction unit 150 of FIG. 1. Referring to FIG. 10, the image correction unit 150 may include a correction image generation unit 910, a filter unit 920, a synthesis unit 930, an intermediate image generation unit 940, and a final image generation unit 950.

The correction image generation unit 910 corrects luminance of an input image using a plurality of different luminance adjustment functions and a plurality of correction parameters calculated by the correction parameter calculation unit 140. Specifically, the correction image generation unit 910 includes a first correction image generation unit 911 and a second correction image generation unit 912.

The first correction image generation unit 911 corrects the luminance of the input image using a plurality of different luminance adjustment functions $R_1(x)$ through $R_3(x)$ and a plurality of first correction parameters $W_1$ through $W_3$ corresponding to the luminance adjustment functions $R_1(x)$ through $R_3(x)$, respectively. In other words, the first correction image generation unit 911 substitutes a luminance value $L_{in}$ of the input image into a luminance adjustment function $R_n(x)$ and multiplies the substitution result by a first correction parameter $W_n$ that corresponds to the luminance adjustment function $R_n(x)$. Consequently, a plurality of first correction images with corrected luminance is generated. The luminance of each of the first correction images may be given by Equation (6).

$$\text{Luminance of first correction image}=W_n \cdot R_n(L_{in}),$$
$$(n=1,2,3) \qquad (6).$$

The first correction images with corrected luminance are provided to the synthesis unit 930. The second correction image generation unit 912 corrects the luminance of the input image using the luminance adjustment functions $R_1(x)$ through $R_3(x)$ and a plurality of second correction parameters $W_4$ through $W_6$ corresponding to the luminance adjustment functions $R_1(x)$ through $R_3(x)$, respectively. Specifically, the second correction image generation unit 912 substitutes the luminance value $L_{in}$ of the input image into the luminance adjustment function $R_n(x)$ and multiplies the substitution result by a second correction parameter $W_{n+3}$ that corresponds to the luminance adjustment function $R_n(x)$. Consequently, a plurality of second correction images with corrected luminance is generated. The luminance of each of the second correction images may be given by Equation (7).

$$\text{Luminance of second correction image}=W_{n+3} \cdot R_n(L_{in}),$$
$$(n=1,2,3) \qquad (7).$$

The second correction images with corrected luminance are provided to the synthesis unit 930, which will be described later.

The filter unit 920 filters the input image using a plurality of bandpass functions corresponding to the luminance adjustment functions $R_1(x)$ through $R_3(x)$, respectively. To this end, the filter unit 920 includes a first filter unit 921 and a second filter unit 922.

The first filter unit 921 filters the input image using a first bandpass function $S_n(x)$ corresponding to each luminance adjustment function $R_n(x)$. Hereinafter, the first bandpass function $S_n(x)$ corresponding to each luminance adjustment function $R_n(x)$ will be described with reference to FIG. 11.

Figure 11:
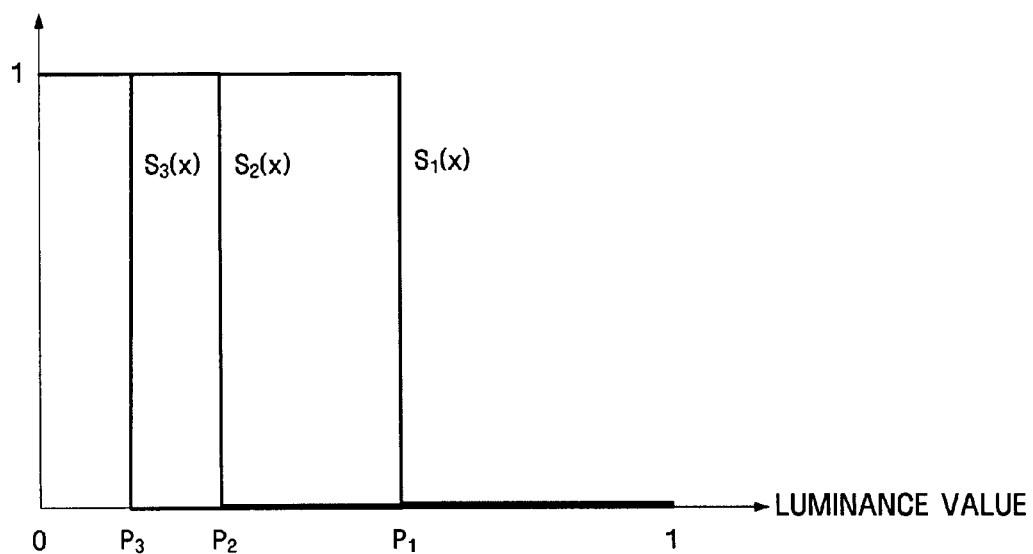
FIG. 11 illustrates first bandpass functions respectively corresponding to luminance adjustment functions illustrated in FIG. 7.

FIG. 11 illustrates first bandpass functions $S_1(x)$ through $S_3(x)$ corresponding to the luminance adjustment functions $R_1(x)$ through $R_3(x)$, respectively, according to an embodiment of the present invention. The first bandpass function $S_n(x)$ illustrated in FIG. 11 is given by Equation (8).

$$S_n(L_{in}) = \begin{cases} 0, & \text{if } P_n \langle L_{in} \\ 1, & \text{if } P_n \geq L_{in}, \end{cases} \quad (8)$$

$$(n = 1, 2, 3),$$

where $L_{in}$ indicates a luminance value of an input image. The first bandpass functions like the one in Equation (8) pass luminance values less than a predetermined luminance value $P_n$ among luminance values of the input image. If the input image is filtered using the first bandpass functions, a blurred image (hereinafter referred to as a first filtered image) may be obtained. The input image is made blurred in order to prevent deterioration of image quality when the first correction images with brightness adjusted using each luminance adjustment function are synthesized. The first bandpass functions may be implemented as low-pass filters (LPFs). If it is hard to implement large-sized spatial LPFs, the size of the input image may be reduced. Then, the input image may be blurred using a small-sized, for example, 5×5, Gaussian mask, and restored to its original size through interpolation. Hereinafter, an image blurred by each LPF while passing therethrough will be indicated by $S_{n\_LPF}$.

If the input image is filtered using the first bandpass function corresponding to each luminance adjustment function, a plurality of first filtered images may be obtained. Then, the first filtered images are provided to the synthesis unit 930, which will be described later. The synthesis unit 930 multiplies luminance values of the first filtered images by luminance values of the first correction images corresponding to the first filtered images, respectively, and generates a plurality of first sub-band images. The luminance of the first sub-band images may be given by Equation (9).

Luminance of first subband image$=W_n \cdot R_n(L_{in}) \cdot S_{n\_LPF}$, $(n=1,2,3)$ (9)

Next, the second filter unit 922 filters the input image using a second bandpass function $H_n$ corresponding to each luminance adjustment function $R_n$. The second bandpass function $H_n$ corresponding to each luminance adjustment function $R_n$ will now be described with reference to FIG. 12.

Figure 12:
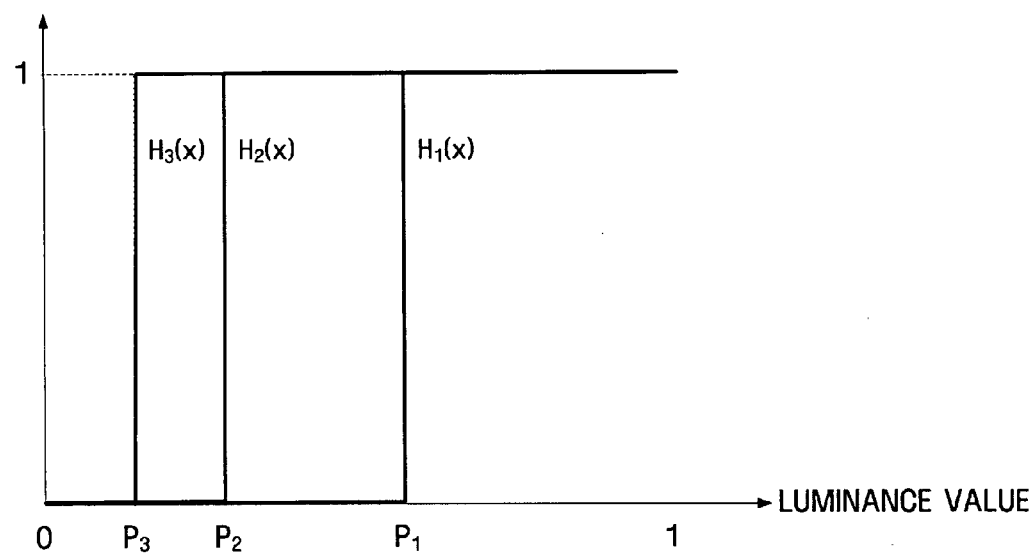
FIG. 12 illustrates second bandpass functions respectively corresponding to the luminance adjustment functions illustrated in FIG. 7.

FIG. 12 illustrates second bandpass functions $H_1(x)$ through $H_3(x)$ corresponding to the luminance adjustment functions $R_1$ through $R_3$, respectively, according to an embodiment of the present invention. The second bandpass function $H_n(x)$ illustrated in FIG. 12 is given by Equation (8).

$$H_n(L_{in}) = \begin{cases} 1, & \text{if } P_n \langle L_{in} \\ 0, & \text{if } P_n \geq L_{in}, \end{cases} \quad (10)$$

$$(n = 1, 2, 3),$$

where $L_{in}$ indicates a luminance value of an input image. The second bandpass functions like the one in Equation (10) pass luminance values greater than a predetermined luminance value $P_n$ among luminance values of the input image. In other words, luminance values less than the predetermined luminance value $P_n$ are blocked. An image that passed through a LPF, which embodies the second bandpass function $H_n$ in Equation (10), is indicated by $H_{n\_LPF}$, and the image $H_{n\_LPF}$ may be given by $1-S_{n\_LPF}$.

If the input image is filtered using the second bandpass function corresponding to each luminance adjustment function, a plurality of second filtered image may be obtained. The second filtered images are provided to the synthesis unit 930, which will be described later. The synthesis unit 930 multiplies luminance values of the second filtered images by luminance values of the second correction images corresponding to the second filtered images, respectively, and generates a plurality of second sub-band images. The luminance of the second sub-band images may be given by Equation (11).

Luminance of second subband image$=W_{n+3} \cdot R_n(L_{in}) \cdot H_{n\_LPF}$, $(n=1,2,3)$ (11).

As described above with reference to Equation (9), the synthesis unit 930 generates the first sub-band images and synthesizes the luminance of the first sub-band images. Consequently, the synthesis unit 930 generates a low-luminance correction image in which the luminance of a low-luminance area of the input image is corrected. Here, luminance $L_{Shadow}$ of the low-luminance correction image may be given by Equation (12).

$L_{Shadow}=W_1 \cdot R_1(L_{in}) \cdot S_{1\_LPF}+W_2 \cdot R_2(L_{in}) \cdot S_{2\_LPF}+W_3 \cdot R_3(L_{in}) \cdot S_{3\_LPF}$ (12).

In addition, the synthesis unit 930 generates the second sub-band images and synthesizes the luminance of the second sub-band images as described above with reference to Equation (11). Consequently, the synthesis unit 930 generates a high-luminance correction image in which the luminance of a high-luminance area of the input image is corrected. Here, luminance $L_{Highlight}$ of the high-luminance correction image may be given by Equation (13).

$L_{Highlight}=W_4 \cdot R_1(L_{in}) \cdot H_{1\_LPF}+W_5 \cdot R_2(L_{in}) \cdot H_{2\_LPF}+W_6 \cdot R_3(L_{in}) \cdot H_{3\_LPF}$ (13).

The low-luminance correction image and the high-luminance correction image generated by the synthesis unit 930 are provided to the intermediate image generation unit 940, which will be described later.

The intermediate image generation unit 940 adds the luminance $L_{Shadow}$ of the low-luminance correction image to luminance $L_{in}$ of the input image and subtracts the luminance $L_{Highlight}$ of the high-luminance correction image from the luminance $L_{in}$ of the input image. As a result, an intermediate image, in which the luminance of the low-luminance area and that of the high-luminance area in the input image are all corrected, is generated. Here, luminance $L_{mix}$ of the intermediate image may be given by Equation (14).

$L_{mix}=L_{in}+L_{Shadow}-L_{Highlight}$ (14).

The final image generation unit 950 applies a predetermined weight to each of the luminance $L_{in}$ of the input image and the luminance $L_{mix}$ of the intermediate image, adds the weighted luminance $L_{in}$ and $L_{mix}$, and generates a final image. Here, luminance $L_{out}$ of the final image may be given by Equation (15).

$$L_{out}=(1-\alpha)\cdot L_{in}+\alpha\cdot L_{mix}, \quad (15)$$

where a indicates a weight that determines rates at which the luminance $L_{in}$ of the input image and the luminance $L_{mix}$ of the intermediate image are to be synthesized, respectively. Here, $0 \leq \alpha \leq 1$.

Next, the final image generation unit 950 adjusts color information of the final image. Specifically, the final image generation unit 950 substitutes the luminance $L_{in}$ of the input image into a function F(x) to adjust saturation of the input image. Then, the final image generation unit 950 multiplies the substitution result by a predetermined gain a and determines a saturation amount $\alpha F(L_{in})$ by which the saturation of the input image is to be increased. Finally, the final image generation unit 950 adds the determined saturation amount $\alpha F(L_{in})$ to the saturation $C_{in}$ of the input image and calculates saturation $C_{out}$ of the final image using Equation (16).

$$C_{out}=C_{in}+\alpha\cdot F(L_{in}) \quad (16).$$

When adjusting the saturation of the final image, the final image generation unit 950 may increase the saturation of the final image in proportion to a correction parameter a to correct the luminance of the input image while a hue value of the input image is fixed. Here, the final image generation unit 950 fixes the hue value of the input image to prevent color distortion. However, a process to correct distorted colors of the input image may be added to the processes performed by the final image generation unit.

Once the color information of the final image is adjusted, the final image generation unit 950 converts the final image in the form of an HVS signal into an RGB signal.

The display unit 160 displays the final image in the form of the RGB signal. Various displays, such as liquid crystal displays (LCDs), plasma display panels (PDPs), light emitting diodes (LEDs), organic LEDs (OLEDs) and flexible displays, may be implemented as the display unit 160. Next, the operations of the elements of the image correction unit 100 of FIG. 1 will now be described with reference to FIG. 13.

FIG. 13 is a flowchart illustrating an image correction method used by the image correction apparatus 100 of FIG. 1 according to an embodiment of the present invention.

First, the image input unit 110 receives an input image (operation S11). The image analysis unit 120 generates a luminance histogram of the input image based on luminance information of the input image and creates a CDF of the input image through integral operation on the luminance histogram (operation S12).

Then, the parameter calculation unit 140 calculates correction parameters, which are to be applied respectively to a plurality of different luminance adjustment functions, based on the CDF of the input image (operation S13).

Operation S13 may include an operation of calculating a plurality of first correction parameters required to correct luminance of a low-luminance area in the input image and an operation of calculating a plurality of second correction parameters required to correct luminance of a high-luminance area in the input image. Each of he luminance adjustment function indicates a target luminance value to which a luminance value of the input image is to be changed. The luminance adjustment function linearly increases luminance values which are less than a predetermined threshold value $P_n$ and linearly decreases luminance values which are greater than the predetermined threshold value $P_n$. Each of the first correction parameters is determined by a slope of a straight line passing through the origin and a point, which has a maximum luminance value from among a plurality of threshold values and a CDF value corresponding to the predetermined luminance value $P_n$ as coordinate values. Each of the second correction parameters is determined by subtracting each of the first correction parameters from 1.

Once the first and second correction parameters are calculated, the image processing unit 150 corrects luminance of the input image using the first and second correction parameters and the luminance adjustment functions (operation S14). Operation S14 may include an operation of generating a low-luminance correction image in which the luminance of the low-luminance area in the input image is corrected and an operation of generating a high-luminance correction image in which the luminance of the high-luminance area in the input image is corrected, an operation of generating an intermediate image by adding the luminance of the low-luminance correction image to the luminance of the input image and subtracting the luminance of the high-luminance correction image from the luminance of the input image, and an operation of generating a final image based on a weighted sum of the luminance of the input image and that of the intermediate image.

The operation of generating the low-luminance correction image may include an operation of generating a plurality of first correction images using the first correction parameters and the luminance adjustment functions, an operation of filtering the input image using first bandpass functions respectively corresponding to the luminance adjustment functions, an operation of generating a plurality of first sub-band images by multiplying luminance values of a plurality of first filtered images, which are generated as a result of the filtering operation, by luminance values of the first correction images respectively corresponding to the first filtered images, and an operation of synthesizing the first sub-band images and generating the low-luminance correction image. In this case, the first bandpass functions pass luminance values which are less than the predetermined threshold value $P_n$.

In addition, the operation of generating the high-luminance correction image may include an operation of generating a plurality of second correction images using the second correction parameters and the luminance adjustment functions, an operation of filtering the input image using second bandpass functions respectively corresponding to the luminance adjustment functions, an operation of generating a plurality of second sub-band images by multiplying luminance values of a plurality of second filtered images, which are generated as a result of the filtering operation, by luminance values of the second correction images respectively corresponding to the second filtered images, and an operation of synthesizing the second sub-band images and generating the high-luminance correction image. In this case, the second bandpass functions pass luminance values which are greater than the predetermined threshold value $P_n$.

Once a final image with corrected luminance is generated, the image processing unit 150 corrects color information of the final image based on the luminance of the final image.

The final image with corrected luminance and color information is displayed on the display unit 160 (operation S15). Consequently, the present invention can output a more elaborate and natural image than the conventional art.

As described above, an image correction apparatus and method according to the present invention provide at least one of the following advantages. Since a CDF of an input image is used, correction parameters can be adaptively set for the input image.

In addition, since the correction parameters are adaptively set for the input image, the performance of image correction can be enhanced.

A plurality of luminance adjustment functions are used in the present invention. Therefore, a low-luminance area and a high-luminance area of the input image can be corrected in a more elaborate manner, and thus a more natural final image can be obtained.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image correction method comprising:
    creating a cumulative density function (CDF) based on a luminance histogram of an input image;
    calculating a plurality of correction parameters, each of which will be respectively applied to a plurality of different luminance adjustment functions, based on the CDF of the input image;
    correcting luminance of the input image using the correction parameters and the luminance adjustment functions; and
    correcting color information based on the corrected luminance,
    wherein each of the luminance adjustment functions indicates a target luminance value to which a luminance value of the input image can be changed,
    wherein each of the luminance adjustment functions comprises an increasing function for luminance values that are less than a predetermined threshold value and a decreasing function for luminance values that are greater than the threshold value.

2. The method of claim 1, wherein the luminance histogram indicates frequency of pixels having a predetermined luminance.

3. The method of claim 1, wherein the calculating of the correction parameters comprises:
    calculating a plurality of first correction parameters for correcting luminance of a low-luminance area in the input image; and
    calculating a plurality of second correction parameters for correction luminance of a high-luminance area in the input image.

4. The method of claim 3, wherein the low-luminance area comprises pixels having the luminance values less than the threshold value, and the high-luminance area comprises pixels having the luminance values greater than the threshold value.

5. The method of claim 3, wherein each of the first correction parameters is a slope passing through the origin of the CDF and a point which has a maximum luminance value from among a plurality of threshold values and a CDF value corresponding to the predetermined luminance value as coordinate values.

6. The method of claim 3, wherein each of the second correction parameters is a value obtained after each of the first correction parameters is subtracted from 1.

7. The method of claim 4, wherein the correcting of the luminance of the input image comprises:
    generating a low-luminance correction image, in which luminance of the low-luminance area is corrected, based on the luminance adjustment functions to which the first correction parameters are respectively applied;
    generating a high-luminance correction image, in which luminance of the high-luminance area is corrected, based on the luminance adjustment functions to which the second correction parameters are respectively applied;
    synthesizing the low-luminance correction image and the high-luminance correction image and generating an intermediate image; and
    determining luminance of a final image based on a weighted sum of the luminance of the input image and the luminance of the intermediate image.

8. The method of claim 7, wherein the generating of the low-luminance correction image comprises:
    generating a plurality of first correction images with corrected luminance using the luminance adjustment functions to which the first correction parameters are respectively applied;
    filtering the input image using a plurality of first bandpass functions respectively corresponding to the luminance adjustment functions and generating a plurality of first filtered images respectively corresponding to the first correction images;
    synthesizing the first correction images and the first filtered images respectively corresponding to the first correction images and generating a plurality of first sub-band images; and
    synthesizing the first sub-band images and generating the low-luminance correction image.

9. The method of claim 7, further comprising correcting the color information of the final image according to the determined luminance thereof.

10. The method of claim 8, wherein the first bandpass functions pass the luminance values less than the predetermined threshold value.

11. The method of claim 8, the generating of the high-luminance correction image comprises:
    generating a plurality of second correction images with corrected luminance using the luminance adjustment functions to which the second correction parameters are respectively applied;
    filtering the input image using a plurality of second bandpass functions respectively corresponding to the luminance adjustment functions and generating a plurality of second filtered images respectively corresponding to the second correction images;
    synthesizing the second correction images and the second filtered images respectively corresponding to the second correction images and generating a plurality of second sub-band images; and
    synthesizing the second sub-band images and generating the high-luminance correction image.

12. The method of claim 11, wherein the second bandpass functions pass the luminance values greater than the predetermined threshold value.

13. The method of claim 1, further comprising increasing the luminance of the input image using a preprocessing function selected from a plurality of preprocessing functions if a percentage of pixels in the input image having luminance values that are lower than a predetermined value is greater than a threshold percentage of pixels, wherein the selection of the preprocessing function is determined by a CDF value corresponding to a predetermined pixel value.

14. An image correction apparatus comprising:
    an image analysis unit creating a CDF based on a luminance histogram of an input image;
    a correction parameter calculation unit calculating a plurality of correction parameters, each of which will be respectively applied to a plurality of different luminance adjustment functions, based on the CDF of the input image; and an image processing unit correcting luminance of the input image using the correction parameters and the luminance adjustment functions and correcting color information based on the corrected luminance, wherein each of the luminance adjustment functions indicates a target luminance value to which a luminance value of the input image can be changed, wherein each of the luminance adjustment functions comprises an increasing function for luminance values that are less than a predetermined threshold value and a decreasing function for luminance values that are greater than the threshold value.

15. The apparatus of claim 14, wherein the luminance histogram indicates frequency of pixels having a predetermined luminance.

16. The apparatus of claim 14, wherein the correction parameter calculation unit calculates a plurality of first correction parameters for correcting luminance of a low-luminance area in the input image and calculates a plurality of second correction parameters for correction luminance of a high-luminance area in the input image.

17. The apparatus of claim 16, wherein the low-luminance area comprises pixels having the luminance values less than the threshold value, and the high-luminance area comprises pixels having the luminance values greater than the threshold value.

18. The apparatus of claim 16, wherein each of the first correction parameters is a slope passing through the origin of the CDF and a point which has a maximum luminance value from among a plurality of threshold values and a CDF value corresponding to the predetermined luminance value as coordinate values.

19. The apparatus of claim 16, wherein each of the second correction parameters is a value obtained after each of the first correction parameters is subtracted from 1.

20. The apparatus of claim 17, wherein the image processing unit comprises:

a correction image generation unit generating a plurality of first correction images with corrected luminance using the luminance adjustment functions to which the first correction parameters are respectively applied and generating a plurality of second correction images with corrected luminance using the luminance adjustment functions to which the second correction parameters are respectively applied;

a filter unit generating a plurality of first filtered images by filtering the input image using a plurality of first bandpass functions respectively corresponding to the luminance adjustment functions and generating a plurality of second filtered images by filtering the input image using a plurality of second bandpass functions respectively corresponding to the luminance adjustment functions and;

a synthesis unit generating a low-luminance correction image, in which luminance of the low-luminance area is corrected, by synthesizing a plurality of first sub-band images generated after the first correction images and the first filtered images respectively corresponding to the first correction images are synthesized and generating a high-luminance correction image, in which luminance of the high-luminance area is corrected, by synthesizing a plurality of second sub-band images generated after the second correction images and the second filtered images respectively corresponding to the second correction images are synthesized;

an intermediate image generation unit synthesizing the low-luminance correction image and the high-luminance correction image and generating an intermediate image; and a final image generation unit generating a final image based on a weighted sum of the luminance of the input image and the luminance of the intermediate image.

21. The apparatus of claim 20, wherein the first bandpass functions pass the luminance values less than the predetermined threshold value.

22. The apparatus of claim 20, wherein the second bandpass functions pass the luminance values greater than the predetermined threshold value.

23. The apparatus of claim 20, wherein the final image generation unit corrects the color information of the final image according to the luminance thereof.

24. The apparatus of claim 14, further comprising a preprocessing unit increasing the luminance of the input image using a preprocessing function selected from a plurality of preprocessing functions if a percentage of pixels in the input image having luminance values lower than a predetermined luminance value is greater than a threshold percentage of pixels, wherein the selection of the preprocessing function is determined by a CDF value corresponding to a predetermined pixel value.

25. The apparatus of claim 14, wherein the image analysis unit comprises:

a histogram analysis unit to creates a luminance histogram of the input image using the luminance information of the input image and calculates parameters that can represent the luminance histogram; and a CDF analysis unit to create the CDF of the input image.

* * * * *

UNITED STATES PATENT AND TRADEMARK OFFICE
CERTIFICATE OF CORRECTION

Page 1 of 1

PATENT NO. : 8,059,913 B2
APPLICATION NO. : 11/826461
DATED : November 15, 2011
INVENTOR(S) : Kwon et al.

It is certified that error appears in the above-identified patent and that said Letters Patent is hereby corrected as shown below:

Column 17, Line 41, In Claim 20, delete "unit generating" and insert -- unit to generate --, therefor.

Column 17, Line 49, In Claim 20, delete "unit generating" and insert -- unit to generate --, therefor.

Column 18, Line 1, In Claim 20, delete "and generating" and insert -- and to generate --, therefor.

Column 18, Line 6, In Claim 20, delete "unit generating" and insert -- unit to generate --, therefor.

Column 18, Line 18, In Claim 20, delete "unit synthesizing" and insert -- unit to synthesize --, therefor.

Column 18, Line 20, In Claim 20, delete "and generating" and insert -- and to generate --, therefor.

Column 18, Line 22, In Claim 20, delete "unit generating" and insert -- unit to generate --, therefor.

Signed and Sealed this
Sixth Day of March, 2012

David J. Kappos
*Director of the United States Patent and Trademark Office*